Patented Sept. 9, 1947

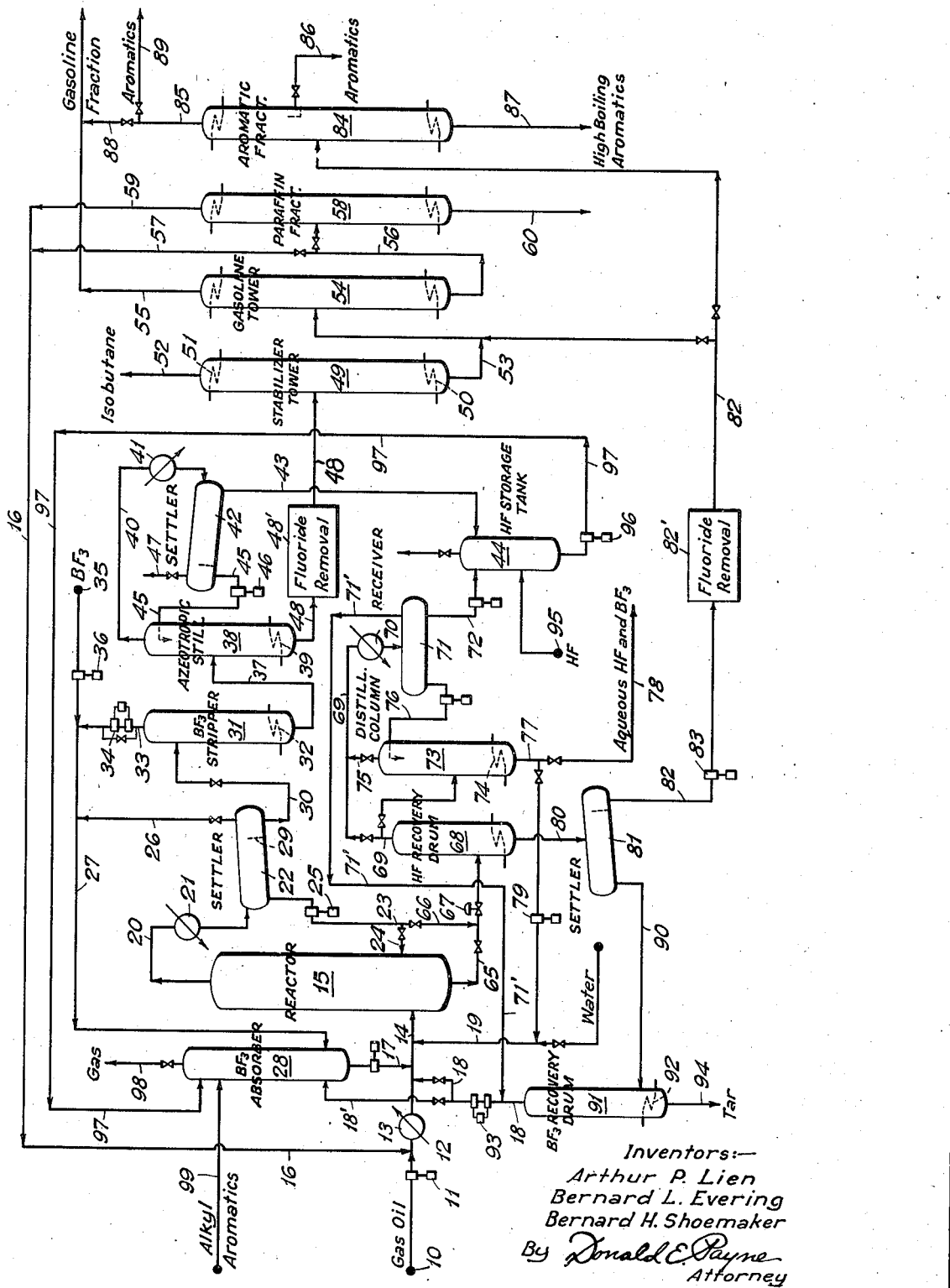

2,427,009

UNITED STATES PATENT OFFICE 2,427,009

CATALYTIC CRACKING OF HYDROCARBONS IN THE PRESENCE OF HYDROGEN FLUORIDE AND BORON FLUORIDE

Arthur P. Lien, Hammond, Ind., Bernard L. Evering, Chicago, Ill., and Bernard H. Shoemaker, Hammond, Ind., assignors to Standard Oil Company, Chicago, Ill., a corporation of Indiana Application August 14, 1944, Serial No. 549,457

3 Claims. (Cl. 196—52)

This invention relates to the catalytic cracking of high boiling hydrocarbon oils for the production of high antiknock motor fuels and valuable aromatic compounds with a hydrogen fluoride-boron fluoride catalyst.

Many different types of halide catalysts have been proposed for the cracking of high boiling hydrocarbons but all of them have had serious drawbacks. The only commercial process is that employing aluminum chloride or an aluminum chloride compound or complex either unpromoted or promoted by a hydrogen halide or other material. Aluminum chloride catalysts are subject to the serious disadvantage that the catalyst activity falls off rather rapidly, the catalyst cannot be recovered by any feasible method and catalyst requirements are therefore exhorbitantly high. In order to avoid these difficulties it has been proposed to employ a boron halide such as boron fluoride but such catalysts are relatively ineffective and require unduly high temperatures and hydrogen pressures so that they have never been commercially attractive. It has been proposed to activate said boron halide catalysts by hydrogen chloride but the use of hydrogen chloride with said catalysts is objectionable because it is a gas which is hard to handle and which gives rise to many operating difficulties. Hydrogen fluoride per se which is a liquid at ordinary temperatures and moderate pressures has recently shown considerable promise as a cracking catalyst but its use leads to the formation of excessive amounts of tarry materials and unduly low yields of valuable products. An object of our invention is to provide a catalytic cracking process employing halide catalysts which will overcome the difficulties of prior art processes and which will produce maximum yields of valuable products with minimum amounts of tarry material and with a minimum amount of catalyst decomposition.

A further object of our invention is to provide an improved process wherein aromatics may be removed from charging stocks and conversion products simultaneously with the cracking operation itself so that the advantages of a preliminary solvent extraction step may be obtained without the necessity of actually employing any preliminary step. A further object is to provide a method and means whereby both low boiling and high boiling aromatic compounds may be readily segregated and separated from an oil which is undergoing cracking and subsequently fractionated to produce unique products of great value.

Another object of our invention is to convert a high boiling hydrocarbon charging stock into highly branched-chain paraffinic hydrocarbons of the gasoline boiling range without producing large amounts of fixed gases and without degrading any of the charging stock to coke. A further object is to provide a process wherein the condensible gaseous hydrocarbons will consist almost entirely of isobutane, i. e. to minimize the production of normal butane, propane and lighter hydrocarbons. A further object is to produce a catalytically cracked naphtha of the gasoline boiling range of optimum product distribution, i. e. one characterized by a smooth boiling range each component of which is characterized by a remarkably high octane number.

An important object of our invention is to provide an improved method and means for effecting contact between high boiling hydrocarbons and a fluoride catalyst in a commercial cracking system and for effecting substantially complete recovery of catalyst for reuse in the system so that make-up catalyst requirements may be reduced to a minimum. More particularly our object is to provide improved methods and means for not only recovering catalyst from the branched-chain paraffin hydrocarbon product stream but also recovering catalyst from the aromatic products which may be separately withdrawn. Other objects will be apparent as the detailed description of our invention proceeds.

In practicing our invention we contact a high boiling hydrocarbon oil such as gas oil at a temperature within the approximate range of 100 to 400° F. or preferably 180 to 300° F. under a pressure sufficient to maintain substantially liquid phase conversion conditions, usually within the approximate pressure range of 250 to 800 pounds per square inch with a hydrogen fluoride-boron fluoride catalyst. With high boron fluoride concentrations and at high temperatures the pressure may be considerably higher and may amount to 2000 to 3000 pounds per square inch. The amount of catalyst employed will usually be within the approximate range of 25 to 75% of the total volume of the reacting mixture, preferably about 30 to 60% of said total volume or about 40 to 50% thereof. In the catalyst composition the hydrogen fluoride predominates, our preferred catalyst containing only about 1 to 40% or preferably about 5 to 20%, e. g. about 10 to 15% by weight of boron fluoride based on the hydrogen fluoride. The time of contact may vary throughout a relatively wide range depending upon the temperature, amount of catalyst in the reaction mixture, intimateness of contact, etc., and in a continuous process wherein we introduce equal amounts by weight of catalyst and charging stock the time of contact may range from about .5 to 50 minutes or more. Preferably we maintain a large mass of catalyst material in a reaction zone and pass the charging stock therethrough at a space velocity within the approximate range of .2 to 4 liquid volumes of charging stock per hour per volume of liquid catalyst in the reactor. In a preferred embodiment of our process gas oil charging stocks are converted to gasoline without coking or the formation of substantial amounts of light hydrocarbon gases by treatment with hydrogen fluoride-boron fluoride catalysts containing about 1 to about 40% by weight of boron fluoride, based on the hydrogen fluoride, at a temperature in the range of about 100 to 400° F., preferably about 180 to 300° F., under sufficient pressure to maintain substantially liquid phase conversion conditions and for a period of time sufficiently long to produce at least 20 weight percent of hydrocarbons boiling in the gasoline boiling range but sufficiently short to prevent butane production in excess of about 20% by weight. This mode of operation is illustrated by the batch test described hereinafter.

The paraffinic reaction products are separated from the catalyst (which contains such aromatic hydrocarbons as are in effect extracted and held in solution by the catalyst layer). A substantial amount of the boron fluoride may be separated from the paraffinic conversion products in a separator or settling zone and the remainder of the boron fluoride may be stripped from the paraffinic products prior to the removal of residual hydrogen fluoride therefrom. Most of the hydrogen fluoride separates from the paraffinic products and may be retained in the reactor or returned thereto from a settler. Any dissolved hydrogen fluoride which is carried with the paraffinic products may be separated therefrom after the boron fluoride stripping step by the distillation of a butane azeotrope which when cooled settles into a hydrogen fluoride layer and a butane layer which may be returned as reflux to the azeotropic distillation still.

The heavier catalyst layer selectively extracts aromatic hydrocarbons during the cracking operation through the formation of a loosely bound boron fluoride-hydrogen fluoride-aromatic complex which is soluble in liquid hydrogen fluoride. Such material is continuously or intermittently withdrawn to a low pressure heater for removal of dissolved and loosely bound hydrogen fluoride and boron fluoride from boron fluoride-hydrogen fluoride-hydrocarbon complex. After the loosely held catalyst has been removed, this withdrawn or segregated complex-aromatic layer is introduced into a settler in which aromatic hydrocarbons are separated from more firmly bound complex. The aromatic hydrocarbons may be combined with the paraffinic hydrocarbons for distillation but we prefer to fractionate separately the aromatic hydrocarbons to produce solvent naphthas and higher boiling specialty aromatic compositions which are valuable by-products of our process. A desirable mode of operation involves blending paraffinic and aromatic hydrocarbons boiling above the gasoline boiling range to produce a recycle stock having a hydrogen:carbon ratio at least as high as that of the fresh charging stock. The firmly bound complex from the settling zone may either be heated to a higher temperature for decomposition thereof and recovery of both boron fluoride and hydrogen fluoride or it may be hydrolyzed with water or other hydrolyzing agent to produce drying oils, plastics, etc.

To avoid any losses of boron fluoride from the system with vent gases we may countercurrently scrub the gases from settling zones, the boron fluoride stripper, etc. with an absorber liquid such, for example, as relatively cold liquid hydrogen fluoride under such pressure so that the boron fluoride is absorbed in the hydrogen fluoride and any propane, ethane, methane, hydrogen, etc., may be vented from the top of the absorber without incurring any appreciable boron fluoride losses.

The invention will be more clearly understood from the following specific example read in conjunction with the accompanying drawing which forms a part of this specification and which is a schematic flow diagram of a continuous commercial catalytic cracking unit employing our improved hydrogen fluoride-boron fluoride catalyst.

The charging stock to our process may be any conventional gas oil from crude petroleum or from a Synthol operation (carbon monoxide-hydrogen synthesis) or from the hydrogenation of carbonaceous materials.

Our process is particularly advantageous for the cracking of refractory hydrocarbons such as the so-called "cycle stocks" produced by thermal cracking or by cracking with catalysts of the silica-alumina type; these refractory gas oils cannot be handled by prior cracking processes (except coking processes which yield very low quality products) because of their tendency toward coke formation and excessive formation of permanent gas. If reduced crudes are employed as a charging stock they are preferably subjected to a preliminary deasphalting step using, for example, the conventional propane deasphalting technique. Our invention is particularly applicable to high sulfur crudes because the objectionable sulfur is largely eliminated therefrom in our cracking operation the sulfur being concentrated in the heavy oil resulting from the sludge complex decomposition step. In this particular example we will describe the catalytic cracking of a refractory gas oil produced as a cycle stock in a conventional cracking operation and boiling chiefly within the range of about 450 to 750° F.

The gas oil charge is introduced from any suitable source 10 by pump 11 through line 12, heater 13 and line 14 to a low point in reactor 15. Cycle gas oil may be introduced into line 12 or line 14 through line 16. Make-up catalyst is introduced into line 14 through line 17 although a portion of the recovered catalyst may be introduced through line 18 and a trace of water or a very small amount of aqueous catalyst may be introduced through line 19. Generally speaking, we prefer to employ catalyst which is substantially anhydrous or which contains only a trace of water, i. e. an amount of the order of .01 to 1% and not more than about 3%.

In this particular case out catalyst is about 17% by weight boron fluoride and 83% by weight hydrogen fluoride although as hereinabove stated that amount of boron fluoride may be as low as 1% or as high as 40% by weight based on hydrogen fluoride. The amount of catalyst introduced through line 14 to the reactor is roughly equal to the amount by weight of charging stock introduced thereto which means that on a volume basis about 7 volumes of catalyst are employed per 10 volumes of oil charged. Here again it should be understood that this ratio may vary depending upon type of charging stock, operating conditions in the reactor; generally speaking larger amounts of catalyst are required with charging stocks of more refractory character (i. e. more deficient in hydrogen and richer in aromatics) and lesser amounts of catalyst are required with relatively clean or more highly paraffinic charging stocks. The weight ratio of hydrocarbon to catalyst introduced into the reactor may thus vary from about 10:1 to 1:2.

The reaction may be effected in any suitable type of reactor on a batchwise, multiple batch, semi-continuous or continuous basis but we prefer to employ a continuous process with a tower-type reactor and to effect the simultaneous cracking and extraction by passing the charging stock upwardly through a column of the catalyst maintained in the liquid phase either with or without mechanical agitation. The reactor may be of the type illustrated by U. S. Letters Patent No. 2,238,802, 2,349,821, etc. It may be about 5 to 50 feet in height and should be designed to withstand a maximum operating pressure which with the high temperatures may be as much as 1000 pounds or more per square inch. Before the reaction is initiated the reactor may be filled about one-half to three-fourths full of catalyst and heated by any conventional means to reaction temperature.

An outstanding feature of our invention is the relatively low temperature at which the catalytic cracking is effected. Usually a temperature of the order of about 212° F. is adequate, our preferred temperature being within the approximate range of 180 to 300° F. although temperatures as low as 100° or as high as 400° F. or more may be employed. The pressure will of course depend on temperature and should be sufficient to maintain substantially liquid phase conversion conditions. At a temperature of about 212° F. the pressure may be of the order of 400 pounds per square inch. The charging stock passes upwardly through the liquid column of catalyst in the reactor at a space velocity which may be about 1 volume of charging stock per hour per volume of catalyst in the reactor although as above stated the space velocity may be as low as .2 or as high as 4 depending on particular circumstances. The bulk of the catalyst separates from the effluent product stream in the upper part of the reactor although some catalyst material is carried with the effluent product stream through line 20 and cooler 21 to separator 22. Catalyst material which settles out in this settler or separator may be returned by lines 23 and 24 to reactor 15, a pump 25 being employed when settler 22 is operated at lower than reactor pressure or is not mounted sufficiently high to insure gravity return.

Boron fluoride together with a small amount of fixed gases which may be produced may be vented from the top of settler 22 through line 26 to line 27 which leads to the base of absorber 28. The remaining liquid product stream flows over weir 29 and passes by line 30 to boron fluoride stripper 31 which is provided with a suitable reheating means or reboiler 32 at its base. Line 30 may be provided with a suitable pressure reducing valve or pump depending upon the relative pressures in settler 22 or stripper 31 respectively. The stripper may operate at a pressure of about 200 or 300 pounds, for example about 250 pounds per square inch, and sufficient heat is supplied to insure the removal of substantially all of the boron fluoride which passes by line 33, compressor 34 (if necessary), line 27 to the base of absorber 28. Make-up boron fluoride may be supplied from source 35 and introduced into the system by compressor 36 to line 27.

After removal of boron fluoride the product stream passes by line 37 to azeotropic distillation still 38 which is provided with a suitable heating means or reboiler 39 at its base and which may likewise be provided with reflux means at its top. A butane-hydrogen fluoride azeotrope passes overhead through line 40, through condenser 41 to settler 42 which is operated at as low a temperature as can be obtained with available cooling water, preferably well below 100° F. The condensed azeotrope separates into a heavier hydrogen fluoride layer which is withdrawn by line 43 to hydrogen fluoride storage tank 44. The upper butane layer is returned by line 45 and pump 46 to still 38 and eventually passes downwardly with the product stream. Any propane or lighter gases may be vented through line 47; such gases should contain no boron fluoride but if they do they may be introduced through line 27 to absorber 28.

The product stream withdrawn from the base of azeotropic still 38 through line 48 is usually substantially free from alkyl fluorides and hence may require no special treatment for alkyl fluoride removal. A conventional bauxite or equivalent treating system 48' is preferably employed at this point however to remove any traces of fluorides which may be present.

The product stream is then introduced by line 48 into stabilizer or debutanizer tower 49 which is provided with a suitable heater or reboiler 50 at its base and suitable reflux means 51 at its top. In this and other fractionating towers any conventional heating and cooling means may be employed and in actual practice the reflux is usually obtained by condensing the overhead and returning at least a part of the resulting condensate to the top of the tower. A butane stream is withdrawn overhead through line 52 and it will consist chiefly of isobutane which is valuable for producing isooctane by alkylation with butenes and for other purposes.

The stabilized or debutanized product stream then passes by line 53 to fractionating tower 54 which is likewise provided with a reboiler at its base and reflux means at its top and which is operated to take overhead through line 55 a fraction boiling in the motor fuel or aviation fuel boiling range. This overhead stream is of exceptionally high quality because it consists essentially of highly branched-chain paraffin hydrocarbons with relatively small amounts of aromatics. Usually this stream is characterized by a fairly smooth boiling curve of which all fractions are of remarkably high octane number and its remarkably low sulfur content, freedom from olefins, etc., makes it remarkably sensitive to tetraethyl lead.

The higher boiling products from the base of tower 54 are withdrawn through line 56 and may be passed through lines 57 and 16 back to charge line 12 or 14 as a recycle stream. Alternatively these heavier hydrocarbons may be introduced into fractionator 58 which may be operated to separate any particular fractions of desired boiling range. We have illustrated the return of light products from this fractionator through line 59 as a recycle stream and the removal of a heavier product through line 60 but it should be understood that the heavier product may be recycled instead of the light product and in fact any product may be recycled and in fact any product may be recycled which is not more valuable for other purposes.

Relatively spent catalyst material may be withdrawn from the reactor through line 65 or from settler 22 through lines 23 and 66 and thence passed through pressure reducing valve 67 to recovery drum 68 which is preferably operated near atmospheric pressure, for example at about 5 to 50 pound gauge pressure and at a temperature of the order of 100 to 190° F., preferably 100 to 160° F. Under these conditions hydrogen fluoride and dissolved or loosely-bound boron fluoride are liberated, passing overhead through line 69. This mixed effluent may pass directly through condenser 70 to receiver 71, where hydrogen fluoride is collected as a liquid and from which boron fluoride may be flashed overhead through line 71', to line 18. Liquid hydrogen fluoride may be pumped from receiver 71 via line 72 to hydrogen fluoride storage tank 44. If there is a tendency for moisture to accumulate in the system we may introduce the effluent from line 69 into silver-lined distillation column 73 which is provided with heating means 74, and we may take substantially anhydrous hydrogen fluoride and boron fluoride overhead through line 75 and condenser 70 to receiver 71, returning a portion of condensate through line 76 to serve as reflux. Aqueous hydrogen fluoride-boron fluoride may be withdrawn from the base of column 73 through line 77 and withdrawn from the system through line 78, although a small part of the aqueous acid mixture may be returned through line 19, by pump 79 in order to supply the desired trace of water in the reactor.

Heating of the product in drum 68 results in decomposition of the loosely bound boron fluoride-hydrogen fluoride-aromatic complex, and by removal of the fluoride components the aromatic hydrocarbons are thrown out of solution. The residue in drum 68, consisting of aromatic hydrocarbons and more firmly bound fluoride-hydrocarbon complex, is withdrawn through line 80 to settler 81 wherein an upper aromatic layer may be recovered from the lower complex layer and passed by line 82, pump 83 and a bauxite system 82' for fluoride removal to line 48, 53 or 59, but preferably to aromatic fractionator 84 which may be one or a plurality of towers provided with suitable reboiler or reflux means.

The aromatics thus recovered may be separated into a valuable high solvency naphtha fraction taken overhead through line 85, one or more intermediate aromatic fractions withdrawn for example through line 86 and a high boiling aromatic fraction withdrawn through line 87. The lower boiling aromatic fractions may of course be employed in motor fuel and may pass through line 88 to line 55. Alternatively a solvency naphtha stream may be separately withdrawn through line 89. The separate recovery of aromatics from our process is an outstanding and important feature thereof because it enables the segregation of extremely valuable hydrocarbons without the necessary expense of a separate solvent extraction operation.

The complex and tarry material which settles out in settler 81 is withdrawn through line 90 to drum 91 which is provided with heating means 92. This drum is operated at about atmospheric pressure or higher and at a temperature of the order of 200 to 500° F., preferably 250 to 350° F. under which conditions the complex is decomposed and boron fluoride and additional hydrogen fluoride are liberated. The liberated boron fluoride and hydrogen fluoride may be compressed by compressor 93 and returned by lines 18 and 14 to reactor 15. Preferably this liberated material passes by line 18' to the base of absorber 28, this arrangement offering the advantages of providing better control on the amount and composition of catalyst entering the reactor and the possible elimination of compressor 93. A heavy residue is withdrawn from the system through line 94.

Make-up hydrogen fluoride may be added to the system from source 95 to storage tank 44. Hydrogen fluoride is pumped from this storage tank by pump 96 and passed by line 97 to the upper part of absorber 28 which may operate at a pressure within the approximate range of 50 to 400 pounds per square inch or higher and in this particular example may operate at about 240 pounds per square inch. At such pressures and at the relatively low temperature of the order of about 100° F. the boron fluoride is absorbed in the hydrogen fluoride but the hydrocarbon gases are unabsorbed therein and may be vented from the top of the absorber through line 98. By this means losses of boron fluoride are substantially prevented while the system is being purged from methane and any other light gases which may tend to accumulate in the system. It should be understood that make-up hydrogen fluoride may be introduced directly into the top of the absorber and that line 43 and/or 72 may likewise lead to the absorber rather than to a hydrogen fluoride storage tank.

Our invention is not limited to the use of hydrogen fluoride as an absorber for boron fluoride since any other selective absorber liquid may be employed. An intimate mixture or solution of hydrofluoric acid and an aromatic hydrocarbon (particularly an alkyl aromatic containing 7 to 11 carbon atoms per molecule) is particularly advantageous because boron fluoride reacts with such mixture to form a complex which is soluble in hydrofluoric acid. Thus we may introduce such alkyl aromatics (for example those from line 86) into the upper part of the absorber through line 99 and we may obtain intimate mixture of such aromatics and hydrofluoric acid either by the manner in which these liquids are introduced into the absorber tower or by the use of mechanical means. Any boron fluoride which is not absorbed in the hydrogen fluoride in the lower part of the absorber will thus be chemically combined with the hydrogen fluoride-aromatic mixture at the top of the absorber so that practically no boron fluoride will leave the top of the tower with extraneous gases even when the absorber is operated at pressures as low as atmospheric pressure. By this method of operation we may avoid the necessity of employing compressors 34 and 93 and likewise avoid the necessity of operating drum 91 at the higher temperatures and pressures which would be required for the introduction of liberated hydrogen fluoride and boron fluoride into a high pressure absorber.

The remarkable and unexpected results obtainable by our process have been demonstrated in batch tests. A gas oil charge was treated with approximately 75 weight percent of catalyst the composition of which was about 6% by weight boron fluoride and 94% by weight hydrogen fluoride. Appreciable cracking was effected at 212° F. with 1½ hours contact time. When the amount of boron fluoride in the catalyst was increased to about 17% substantial conversion was effected at 212° F. with 1½ hours contact time, producing about 19% of condensible gaseous hydrocarbons of which over 85% was isobutane, upwards of 8% was normal butane and only about 5 to 6% was propane. Upwards of 21 weight percent of the total product was butane-free, 400° F. end point gasoline of which about 26% was pentane (chiefly isopentane), about 43% $C_6$ and $C_7$ hydrocarbons (mostly branched-chain hexanes and heptanes) and the balance $C_8$ and heavier hydrocarbons (also mostly branched-chain paraffins). Approximately 29 weight percent of the total product constituted heavier hydrocarbons boiling above 300° F. suitable for recycle. The remaining 30% of the hydrocarbons was associated with complex as a mobile liquid red oil. In this particular case the aromatics and sulfur had previously been extracted from the charging stock by hydrogen fluoride-boron fluoride but we have found that the catalyst absorbs aromatics in the contacting step itself under conversion conditions so that aromatics may normally be recovered from the liquid red oil when it acts as an aromatic extractor in the conversion process itself.

That portion of the hydrocarbon material which is not separated from the complex after removal of hydrogen fluoride and boron fluoride therefrom can be recovered in various ways, for example by heating the complex to a temperature of the order of 250 to 500° F. or more (but usually not substantially above 350° F. at atmospheric pressure) the hydrogen fluoride and boron fluoride may be almost quantitatively recovered from decomposed complex and the remaining hydrocarbon will constitute a heavy residue. However, if the red oil is hydrolyzed it may be converted into an unsaturated oil of good drying property. The ultimate disposition of the complex will thus depend upon the economics in any particular case, i. e. on whether or not the losses of catalyst material by hydrolysis is sufficiently offset by the increase in value of the resulting hydrocarbon.

Boron fluoride alone is relatively ineffective as a cracking catalyst at temperatures of the order of 200 to 300° F., the suggested temperatures for the use of boron fluoride as a cracking catalyst usually range from about 500 to 1500° F. Hydrogen fluoride alone has been found to effect substantial cracking at temperatures as low as 320° F. with contact times of 4 hours employing about 200 to 300 weight percent of catalyst based on hydrocarbon charged. However, even with these large catalyst volumes, longer contact times and higher temperatures the amount of butane-free, 400 end point gasoline produced was considerably lower than by our process, the amount of propane produced was almost three times as great as in our process, and the amount of tarry residue was of an entirely different order of magnitude, about 42 to 45 percent of viscous black tar as compared with our approximately 30% mobile liquid red oil. Thus our invention provides a method and means for effecting cracking of gas oil at the remarkably low temperature of about 212° F. with relatively short contact time and with a relatively small amount of catalyst and in addition to producing substantial amounts of isobutane we may obtain large yields of exceptionally high anti-knock gasoline, separate valuable aromatic hydrocarbons and a useful residue in addition to almost quantitatively recovering for reuse the catalyst material employed.

While we have described in detail a specific example of our invention and conditions to be employed therein it should be understood that our invention is not limited to this example or to the stated conditions since other alternative conditions and modifications will be apparent from the above description to those skilled in the art.

We claim:

1. The method of effecting continuous catalytic cracking on a recycle basis while maintaining a hydrogen: carbon ratio in the recycled stream which is at least as high as the hydrogen:carbon ratio of the incoming charging stock which method comprises contacting a mixture of incoming charging stock and recycled stock, said mixture containing aromatic hydrocarbons, with a hydrogen fluoride-boron fluoride catalyst at a temperature within the approximate range of 100 to 400° F. and for a period of time sufficient to effect a substantial conversion of the charging stock into hydrocarbons of the gasoline boiling range, effecting the conversion under sufficient pressure to obtain substantially liquid phase conversion conditions, effecting separation of the reaction mixture into a lighter layer and a heavier layer, the heavier layer containing extracted aromatic hydrocarbons, subjecting said heavier layer to distillation to separate loosely bound catalyst, thereafter separating aromatic hydrocarbons from said heavier layer, returning separated loosely bound catalyst to the reaction zone, recycling as a first recycle stream to the reaction zone a portion of the separated aromatic hydrocarbons, separating catalyst material from the lighter layer, subsequently fractionating said lighter layer to obtain a fraction boiling within the gasoline boiling range and at least one fraction boiling above the gasoline boiling range, recycling as a second recycle stream to the reaction zone at least a portion of the last-named fraction, and adjusting the ratios of said first and second recycle streams to maintain a hydrogen: carbon ratio in the combined recycle streams at least as high as the hydrogen:carbon ratio of the incoming charging stock.

2. The method of converting hydrocarbons of the gas oil boiling range into more valuable products, which method comprises continuously introducing hydrocarbons into a reaction zone, continuously introducing into said reaction zone a catalyst consisting essentially of hydrogen fluoride and about 1 to about 40 per cent by weight of boron fluoride, based on said hydrogen fluoride, intimately contacting said catalyst with said hydrocarbons in said reaction zone at a temperature between about 100° F. and about 400° F. under a pressure sufficient to maintain substantially liquid phase conversion conditions, continuing said contacting for a period of time sufficient to effect substantial hydrocarbon conversion, separating a hydrocarbon liquid from the conversion mixture, removing catalyst material from said separated hydrocarbon liquid and subsequently fractionating said separated hydrocarbon liquid to obtain a fraction thereof boiling within the gasoline boiling range, separating from the conversion mixture a catalyst-hydrocarbon composition heavier than said hydrocarbon liquid, removing loosely-bound hydrogen fluoride and boron fluoride from said composition by distillation, separating aromatic hydrocarbons from said composition after loosely-bound hydrogen fluoride and boron fluoride have been removed therefrom, heating the residue from which aromatic hydrocarbons have been removed to a temperature sufficiently high to decompose complex material contained therein and to liberate hitherto firmly bound hydrogen fluoride and boron fluoride therefrom, and returning said liberated hydrogen fluoride and boron fluoride to said reaction zone.

3. A hydrocarbon refining process which comprises simultaneously cracking and extracting a high boiling hydrocarbon charging stock containing aromatics, which process comprises maintaining within a reaction zone a liquid column of catalyst consisting essentially of liquid hydrogen fluoride containing between about 1 and about 40 per cent by weight of boron fluoride, based on the weight of said hydrogen fluoride, dispersing said hydrocarbon charging stock upwardly through said column of catalyst at a rate such that the contact time between the charging stock and catalyst is sufficient to effect substantial cracking, said rate being selected from space velocities between about 0.2 and about 4 volumes of charging stock per hour per volume of liquid catalyst in said column, maintaining within said reaction zone a temperature between about 100° F. and about 400° F. and a pressure sufficient to maintain substantially liquid phase reaction conditions, separating the reaction mixture into a light upper layer and a heavier lower layer, recovering catalyst from said upper layer and subsequently fractionating said upper layer, recovering catalyst material and aromatic hydrocarbons from said lower layer and returning catalyst recovered from the lower layer and the upper layer, respectively, to said reaction zone.

ARTHUR P. LIEN.
BERNARD L. EVERING.
BERNARD H. SHOEMAKER.

REFERENCES CITED

The following references are of record in the file of this patent:

UNITED STATES PATENTS

| Number | Name | Date |
|---|---|---|
| 2,172,146 | Ruthruff | Sept. 5, 1939 |
| 2,216,274 | Grosse | Oct. 1, 1940 |
| 2,320,629 | Matuszak | June 1, 1943 |
| 2,343,744 | Burk | Mar. 7, 1944 |
| 2,343,841 | Burk | Mar. 7, 1944 |
| 2,357,495 | Bloch | Sept. 4, 1944 |
| 2,405,995 | Burk | Aug. 20, 1946 |